United States Patent
Posey

(10) Patent No.: US 9,353,271 B2
(45) Date of Patent: May 31, 2016

(54) LOW GLOSS COATINGS

(71) Applicant: PPG Industries Ohio, Inc., Cleveland, OH (US)

(72) Inventor: David Posey, Greensboro, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 535 days.

(21) Appl. No.: 13/799,412

(22) Filed: Mar. 13, 2013

(65) Prior Publication Data

US 2014/0272438 A1    Sep. 18, 2014

(51) Int. Cl.
*C09D 5/00* (2006.01)
*C09D 7/00* (2006.01)
*C09D 7/12* (2006.01)

(52) U.S. Cl.
CPC .............. *C09D 7/005* (2013.01); *C09D 5/006* (2013.01); *C09D 7/1225* (2013.01)

(58) Field of Classification Search
None
See application file for complete search history.

(56) References Cited

U.S. PATENT DOCUMENTS

| | | |
|---|---|---|
| 4,017,652 A | 4/1977 | Gruber |
| 6,833,186 B2 | 12/2004 | Perrine et al. |
| 8,258,225 B2 | 9/2012 | Barkac et al. |
| 8,568,849 B2 | 10/2013 | Shi et al. |
| 2004/0047792 A1* | 3/2004 | Schubert ............... C01B 33/193 423/335 |
| 2005/0065268 A1* | 3/2005 | Morea-Swift ......... C09C 1/3072 524/492 |
| 2005/0249939 A1* | 11/2005 | Barkac et al. .................. 428/323 |
| 2007/0256256 A1 | 11/2007 | Dean et al. |
| 2011/0159298 A1 | 6/2011 | Nesbitt et al. |
| 2013/0079433 A1 | 3/2013 | Lindner et al. |
| 2013/0131268 A1 | 5/2013 | Buckmann et al. |

FOREIGN PATENT DOCUMENTS

| | | |
|---|---|---|
| JP | 2005/138492 A | 6/2005 |
| JP | 2009/175387 A | 8/2009 |
| WO | WO 2011/098514 A1 | 8/2011 |
| WO | 2012065828 A1 | 5/2012 |
| WO | WO 2012/141723 A2 | 10/2012 |

OTHER PUBLICATIONS

Hussin, Novel Matting Agent Technology for Waterborne Wood Coatings, Proc. European Coatings Conf., "High Performance Waterborne Clearcoats", 2007, pp. 193-207, Berlin.
Linares, Novel Matting Agents for Low VOC Coatings, Proc. American Coatings Conf., 2012, 10 pages, Indianapolis.

* cited by examiner

*Primary Examiner* — Sheeba Ahmed
(74) *Attorney, Agent, or Firm* — Justin P. Martinchek

(57) ABSTRACT

A low-gloss coating composition is disclosed. The coating composition comprises a unique blend of particles, including untreated silica and organic treated silica and wax treated silica. The use of these particles in combination provides for a significant reduction in the weight percent of certain particles that can impart a suitable level of gloss to a coating. The particles can be included, for example, in a urethane acrylate binder that can be cured using UV radiation.

16 Claims, No Drawings

LOW GLOSS COATINGS

FIELD OF THE INVENTION

The present invention relates to low gloss coating compositions and methods for using the same. More specifically, the improved low gloss with sufficient film build is achieved by using a combination of types of silica particles in a coating composition.

BACKGROUND OF THE INVENTION

Wood floor coverings are often treated with a multi-layer coating system to color and protect the wood from foot traffic and contact with heavy objects. Such multi-layered coating systems typically include a stain layer which penetrates and colors the wood, a sealer layer that provides film build (thickness) to coating system as well as adhesion between the layers, and a topcoat that protects the underlying layers from damage. One or more layers of sealers and/or topcoats can be applied to the flooring. Low gloss of the coating system, resistance to abrasion and marring and resistance to contamination or staining caused by a variety of sources is also desirable.

The sealer layer provides a foundation for the coating system, and sufficient "film build" is desired for a suitable foundation. The film build of the sealer layer is determined at least in part by the viscosity of the sealer composition. Low gloss levels in the sealer layer are aesthetically desirable and can be accomplished by adding filler material such as silica, however, such filler additions can adversely impact the viscosity, rendering the sealer composition difficult to use.

SUMMARY OF THE INVENTION

The present invention is directed to low gloss coating systems comprising a binder and a silica composition comprising first silica particles comprising untreated silica, second silica particles comprising organic treated silica, and third silica particles comprising wax treated silica.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, moieties in a general chemical formula and quantities of ingredients used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The present invention is directed to a coating system that exhibits low gloss and excellent physical properties comprising a binder and a multiple silica composition comprising first silica particles comprising untreated silica, second silica particles comprising organic treated silica, and third silica particles comprising wax treated silica. It has been surprisingly discovered that use of the combination of particles described herein provides a coating having low gloss typically only seen with coatings in which much higher levels of particles are added. The low gloss of the coating system of the present invention is achieved with acceptable film build. "Low gloss", as used herein, refers to a level of specular reflection from a surface, recorded as gloss units, typically less than 20 gloss units. "Wear clarity", as used herein, refers to the ability to resist appearance degradation. Wear clarity can be visually observed as whitening, mar, scuffing, gloss loss, scratches, etc. or can be measured using a device such as a hazemeter, glossmeter, or the like. Wear clarity can be assessed, for example, by abrading a surface and observing changes to the coating appearance after abrasion.

It has been further discovered that the coating system of the present invention has excellent physical properties including adhesion, wear resistance and stain resistance. "Wear resistance" and "abrasion resistance", used interchangeably herein, refer to the ability of a material to resist displacement upon exposure to relative motion against hard particles or protuberances. Displacement is usually observed visually, as a removal of the coating material thereby exposing the underlying surface. Wear resistance can be determined through a variety of tests known in the art, such as a Taber abrasion test, a Gardner scrubber test, a falling sand test and the like.

The coating composition of the present invention is particularly suited for use as one layer of a multi-layer coating system, such as is typically used for wood floor coatings. In such wood floor coating systems, a first stain composition is applied directly to the wood floor, at least one sealer composition is applied thereover, followed by at least one topcoat compositions. In one embodiment of the present invention, the coating system is used as the sealer composition in such a multi-layer system. While the multiple silica composition is described herein relative to its use in a sealer composition, that is not meant to be limiting, as it may be employed in other coating applications.

The coating system of the present invention includes a binder and a multiple silica composition comprising three types of silica particles: untreated silica, organic treated silica and wax treated silica.

By "untreated silica" it is meant silica (i.e. silicon dioxide) that has not been subjected to a surface treatment, typically obtained by precipitation, such as thermal precipitation. In general, untreated silica has particles sized 7-15 microns, which can be used to reduce the gloss of a coating composition, but often at the expense of increased viscosity of the coating composition. Suitable examples thereof include certain products sold by Evonik Degussa under the trademark ACEMATT®, e.g. ACEMATT® HK400, ACEMATT® HK460, ACEMATT® HK450, ACEMATT® HK440, ACEMATT® HK125, ACEMATT® HK810, ACEMATT® HK790 or sold by PPG Industries, Inc. under the LO-VEL® trademark such as LO-VEL®6000. Other sources of untreated silica include W.R. Grace & Co., Fuji Silysia and Ineos.

Organic treated silica refers to silica having significant surface modification, such as with a silating agent. Suitable examples thereof include products sold by W. R. Grace under the SYLOID® trademark, such as SYLOID® RAD2105, as well as products from Ineos. Such highly organic treated silica may have particle sizes of 3-7 microns, i.e. smaller than the particle size of typical untreated silica. In a coating composition, the smaller particle size of highly organic treated silica has less impact on the coating viscosity, yet with concomitant less impact on reducing gloss.

Wax treated silica refers to silica coated with a wax, such as polyolefin wax, as sold by Evonik Degussa under the ACEMATT® trademark, e.g. ACEMATT® OK412. The particle size of wax treated silica may be the same as or similar to that of the highly organic treated silica, such as 3-7 microns.

While each of these three types of silica may be known to be used individually in various coating systems, it has been found that using all these in a single coating results in a beneficial synergistic effect of low gloss with acceptable viscosity and film build. The relative amount of each of the untreated, treated and wax-coated silicas may be 1:1:1. The total amount by weight of all three silicas in a coating composition may be 5 to 20 wt. %, depending on the desired gloss level. While not intending to be held to a particular theory, it is believed that, when used in a coating composition, the combination of the larger untreated silica particles with two smaller sized silica particles (organic treated silica and wax treated silica) results in a combined silica composition that achieves the low gloss associated with larger silica and the excellent film build and uniform appearance associated with smaller silica. The variation in size, physical properties and chemical properties of the three types of silicas has been found to achieve a beneficial, synergistic effect in coating compositions, particularly sealer compositions.

The coating composition of the present invention, in addition to the particles described above, further includes a binder material typically used in the art for such coatings. As used herein, the term "polymer" refers to oligomers and both homopolymers and copolymers. Examples include urethanes, acrylics, melamines, polyvinylchlorides, polyolefins, epoxy polymers, polyester, polyethers and the like. Urethanes are particularly suitable for use in the present invention, especially those that can undergo radiation curing, such as through exposure to ultraviolet (UV) radiation or electron beam radiation. A number of other oligomeric binders and functionalities can also be used, as can systems that cure by free radical or cationic cure mechanisms, all of which will be familiar to those skilled in the art.

Thus, in one embodiment of the invention, the coating composition crosslinks upon exposure to UV radiation to produce a clear film. Any suitable source of UV radiation having a wavelength ranging from 180 to 400 nanometers may be employed. Particular wavelengths may be especially suitable, depending on the photoinitiator used. Suitable sources of UV radiation are widely available and include, for example, mercury arcs, carbon arcs, low pressure mercury lamps, medium pressure lamps, high pressure mercury lamps, swirl-flow plasma arcs and ultraviolet radiation emitting diodes.

When UV radiation is used to cure the compositions of the invention, the compositions typically contain from 0.1 to 5.0 percent, based on solids, of a photopolymerization initiator (and/or photopolymerization sensitizer). Photoinitiators and photosensitizers are generally known in the art. Examples of photoinitiators include isobutyl benzoin ether, mixtures of butyl isomers of butyl benzoin ether, $\alpha,\alpha$-diethoxyacetophenone, and $\alpha,\alpha$-dimethoxy-$\alpha$-phenylacetophenone. Examples of photosensitizers include benzophenone, anthraquinone, thioxanthone and phosphine oxides. Other examples of photoinitiators and photosensitizers can be found in U.S. Pat. No. 4,017,652, incorporated by reference herein. UV stabilizers can also be added including benzotriazoles, hydrophenyl triazines and hindered amine light stabilizers, for example those commercially available from Ciba Specialty Chemicals under the TINUVIN® trademark.

Other additives standardly used in the art can also be used in the present compositions. These include organic solvents such as esters, for example n-butyl acetate, ethyl acetate and isobutyl acetate; ether alcohols, such as ethylene glycol monoethyl ether, ethylene glycol monobutyl ether, propylene glycol monomethyl ether, dipropylene glycol monoethyl ether, propylene glycol monoethylether acetate, ethylene glycol monoethylether acetate, dipropylene glycol monoethylether acetate and diethylene glycol monoethylether acetate; ketones, such as methyl ethyl ketone, methyl n-butyl ketone and methyl isobutyl ketone; lower alkanols containing 2 to 4 carbon atoms, such as ethanol, propanol, isopropanol and butanol; and aromatic hydrocarbons, such as xylene, toluene and naphtha. Other additives can also be used, including rheology modifiers, flow additives, deaerators, gloss control additives, diluents, etc.

It will be appreciated that the present compositions are not limited to those in which a UV curable binder is present. For example, moisture cure urethanes, air drying alkyds, catalyzed alkyds, ambient temperature cure epoxy-amines and hydroxy-isocyanates, heat curable epoxy-acids, hydroxylaminoplast as well as other aminoplast curing chemistries, lacquers such as acrylics or polyester lacquers or dispersions can all be used according to the present invention. The binders can be organic solvent based or aqueous based.

An effective amount of the silica particles should be added to the coating composition of the present invention to impart the desired gloss level and film build. This amount can be as high as 20 weight percent of the total weight of the composition. Generally, a higher the concentration of the silica particles reduces the gloss, but at the expense of higher viscosity. One skilled in the art can determine the appropriate weight percent of particles or "load" to add to the present compositions to obtain a desired gloss without compromising film build. Any amount of particles that improves gloss is an "effective amount" within the present invention.

The present invention is further directed to a method of coating a substrate, such as flooring comprising applying to at least a portion of the substrate the coating composition described herein. The coatings of the present invention can be applied by any conventional means, including spraying, curtain coating, dip padding, roll coating, and brushing. Any substrate can be coated with the present compositions, including, for example, wood flooring, wood veneer or flexible plastic. These may include vinyl flooring, ceramic tile, and the like. Examples of other substrates include metal and rigid plastics such as polycarbonate and polyester and glass. Wood and wood veneer substrates other than flooring can also be treated according to the present invention, such as desks, table tops and the like.

It will be appreciated that in the case of wood flooring, a number of different layers may be applied to the flooring, either before or after installation; these layers can include, for example, a stain coating, a sealer, and a topcoat. The multiple silica composition of the present invention most typically is present in the sealer, although it can appear in any layer, with the stain coating and/or the topcoat also containing silica. In such a multi-layered composition, all layers exhibit low gloss value, with the stain layer having a maximum gloss value of 20, the sealer layer containing the three silica particles having a maximum gloss value of 15 and the topcoat layer having a maximum gloss value of 7. One or more topcoat layers may be used. Accordingly, the present invention is further directed to wood flooring comprising at least one coating layer, wherein the coating layer is formed from the coating composition of the present invention. Typically, such wood flooring will have two or more layers.

EXAMPLES

The following Examples are presented to demonstrate the general principles of the invention. All amounts listed are described in parts by weight, unless otherwise indicated. The invention should not be considered as limited to the specific Examples presented. Whereas particular embodiments of this invention have been described above for purposes of illustration, it will be evident to those skilled in the art that numerous variations of the details of the present invention may be made without departing from the invention as defined in the appended claims.

Example 1

Stain Composition

A stain composition was produced from the components listed in Table 1. All liquid components were added to a mixing vessel and agitated, followed by a second addition of all powders under agitation, with mixing for 1 hour.

TABLE 1

| Component | Weight Percent |
|---|---|
| Polyester acrylate oligomer[1] | 49 |
| 1,6 Hexane diol diacrylate[2] | 25 |
| Glycerol propoxylate triacrylate | 11 |
| n-Vinyl 2-pyrrolidone | 5 |
| LO-VEL ® 6000[3] | 5 |
| IRGACURE ® 819[4] | 2 |
| DAROCUR ® 1173[5] | 2 |
| IRGACURE ® 184[6] | 1 |

[1]LAROMER ® PE 55 F, available from BASF
[2]SR 239, available from Sartomer USA, LLC
[3]Untreated silica, available from PPG Industries, Inc.
[4]Photoinitiator, available from Ciba Specialty Chemicals
[5]Photoinitiator, available from Ciba Specialty Chemicals
[6]Photoinitiator, available from Ciba Specialty Chemicals Example 2

Sealer Composition

A sealer composition was produced from the components listed in Table 2. All liquid components were added to a mixing vessel and agitated, followed by a second addition of all powders under agitation, with mixing for 1 hour.

TABLE 2

| Component | Weight Percent |
|---|---|
| Urethane acrylate oligomer[7] | 37 |
| 1,6 Hexane diol diacrylate[8] | 15 |
| Polyester acrylate oligomer[9] | 16 |
| Tripropylene glycol diacrylate[10] | 15 |
| LO-VEL ®6000 | 4 |
| ACEMATT ® OK-412[11] | 4 |
| SYLOID ® RAD 2105[12] | 4 |
| Talc | 2 |
| DAROCUR ® 1173 | 2 |
| Benzophenone | 0.8 |
| Defoamer[13] | 0.2 |

[7]Aromatic urethane acrylate oligomer resin
[8]SR 239
[9]LAROMER ® PE 55 F, available from BASF
[10]SR 306, available from Sartomer USA, LLC
[11]Wax treated silica, available from Evonik Industries
[12]Organic treated silica, available from W.R. Grace & Co.
[13]TEGO ® AIREX 920, available from Evonik Industries Example 3

Topcoat Composition

A topcoat composition was produced from the components listed in Table 3. All liquid components were added to a mixing vessel and agitated, followed by a second addition of all powders under agitation, with mixing for 1 hour.

TABLE 3

| Component | Weight Percent |
|---|---|
| Polyester acrylate oligomer[14] | 20 |
| Tripropylene glycol diacrylate[15] | 17 |
| Urethane acrylate oligomer[16] | 15 |
| 1,6 Hexane diol diacrylate[17] | 14 |
| n-Vinyl 2-pyrrolidone[18] | 12 |
| PERGOPAK ® M3[19] | 9 |
| GASIL ® HP210[20] | 4.5 |
| Benzophenone | 2.5 |
| DAROCUR ® 1173 | 2 |
| Aluminum oxide[21] | 2 |
| Leveling additive[22] | 1 |
| Ceramic beads[23] | 1 |

[14]EBECRYL ® 809, available from Cytec Surface Specialties
[15]SR306
[16]Aromatic urethane acrylate oligomer resin
[17]SR239
[18]V-PYRO4 RC, available from ISP Technologies
[19]Organic flattening agent, available from Albemarle Corporation
[20]Organic treated silica gel, available from PQ Corporation
[21]WCA 3S microabrasive, available from Micro Abrasives Corporation
[22]Paint Additive II, available from Dow Chemical Corporation
[23]Zeospheres W-210, available from Zeospheres Ceramics, LLC Example 4

To a wooden board, an 8-13 microns thick coating of the stain produced in Example 1 was applied using a rollcoater with a smooth roll. The excess was wiped off with a cylindrical brush and UV-cured with 200-400 millijoules of UVA band energy cured with either a mercury or a gallium doped bulb. The board was lightly de-ribbed with a 280 grit cylindrical brush. The sealer of Example 2 was applied thereto in a thickness of 8-15 microns with a smooth roll and UV-cured with 200-280 millijoules of UVA band energy cured with a mercury bulb. The surface was lightly de-ribbed with a 280 grit cylindrical brush. A first coat of the topcoat of Example 3 was applied thereto with a smooth roller depositing 4-6 microns and UV-cured at 200-250 millijoules of UVA band energy with a mercury bulb. A final coat of the topcoat produced in Example 3 was applied with a smooth roller depositing 4-6 microns and UV-curing at 600-800 millijoules of UVA band energy with mercury bulbs.

The board had a smooth, unfilled appearance with a 60° gloss value of below 8. The gloss was measured after each curing step was as listed in Table 4.

TABLE 4

| Cured Coating | Gloss Value |
|---|---|
| Stain | 20 |
| Sealer | 10 |
| 1$^{st}$ Topcoat | 7 |
| 2$^{nd}$ Topcoat | 5 |

Example 5

The coating system of Example 4 was compared to conventional coating systems. The coating formed from the composition of Example 4 and two controls (a glossy, abrasion resistant commercial UV-curable coating composition commercially available as 50 Gloss Crown™ UV Topcoat and a MINWAX® oil system) were coated onto wood panels and evaluated using the following tests, as reported in Table 5.

Cross Hatch Adhesion Test: In accordance with ASTM D3359, a crosshatch pattern is cut through the films formed on the wood panels. A pressure-adhesive tape is then applied over the crosshatch cut. After about 90 seconds, the tape is removed and the panels are inspected for removal of the coatings. The adhesion is assessed on a 0 to 5 scale with 0 being complete failure and 5 constituting excellent adhesion.

Nickel Scrape: The coated wood samples are scraped with a nickel held at 45° to the surface and rated on a scale of 0-10 for removal, total removal being a 0 and no effect being a 10.

Belmar Hoffman: A 3000 gram weight is loaded onto a testing device fitted with a cylinder stylus. Movement of the coated wood samples causes scraping and cutting by the cylindrical stylus. The weight is reduces until no failure is found. If no failure occurs at 3000 grams, this is indicated by 3000+.

Belmar Loop: An 11 kg weight is loaded onto a testing device fitted with a loop stylus. Movement of the coated wood samples causes scraping or marring by the loop stylus. The weight is reduced until no failure is found. If no failure occurs at 11 kg, this is indicated as 11$^+$ kg.

Gloss: The gloss of the coated wood samples is measured with a glossmeter.

Gloss Retention-Scrub Type: Coated wood samples are subjected to a Maroon Scotch Brite Pad (very fine, Type A) is set underneath a 2 pound weight on a linear abrasion tester that oscillated for a set number of cycles at a speed of 7.2. The gloss of the samples is tested at the outset and after 50, 100 and 200 cycles. The gloss retention is calculated as the percent of final gloss value of the initial value.

CS-17 Taber and S-42 Taber: A strip of sandpaper (S-42 type) is attached to a rubber wheel or a CS-17 abradant rubber wheel is used. The coated samples are contacted by the wheel with a 500 g weight. The number of rotations (cycles) to wear through until the unstained wood substrate is visible in four quadrants.

Steel Wool Scratch Test: The coated panels are subjected to abrasion from three different steel wool pads (#3 Coarse steel wool pad, a #1 Medium steel wool pad, and a #000 Extra Fine steel wool pad) and a maroon SCOTCH BRITE pad. Each pad is slid across the coated panels for 20 repetitions where one repetition is performed by sliding the pad across the entire panel and then back following the same track. The panels are evaluated for scratches and discoloration on a scale of 0 to 5 with 0 representing no color change/scratches and 5 representing strong discoloration/film removal.

Stain Resistance: In accordance with ASTM D1308, an eyedropper is used to place 2-3 drops of each of the following materials onto the wood panels: yellow mustard, iodine tincture (2%), black RIT dye solution, red food coloring, brown shoe polish, and a nail polish remover. After the materials are applied to the wood panels, a 1 oz. plastic medicine cup is placed over each material. After 6 hours, the plastic medicine cup is removed and the materials are wiped with a paper towel. The panels are then assessed for stains on a scale of 0 to 5 with 0 representing no staining and 5 representing severe staining. Stain testing of "Sharpie" Markers is performed three times, at outset, after cleaning with household 409® cleaner and after cleaning with rubbing alcohol.

Hot/Cold checks: The coated panels are heated in an oven to 120° F. for 1 hour, then removed and immediately placed in a freezer for 1 hour. The panels are returned to room temperature and inspected for cracks, ten times. The results are set forth in Table 5.

TABLE 5

| | Coating System | | |
|---|---|---|---|
| Test | Example 4 | UV-curable coating | MINWAX ® |
| Cross Hatch | 5B | 5B | 5B |
| Nickel | 8 | 9 | 10 |
| Belmar Hoffman (g) | 1000 | 1200 | 3000+ |
| Belmar Loop (kg) | 11+ | 10 | 11+ |
| Gloss | 4.5 | 48 | 4.8 |
| Gloss Retention-Scrub | | | |
| Initial | 4.5 | 48.3 | 4.8 |
| 50 cycles | 3.9 | 50.8 | 3.5 |
| 100 cycles | 3.7 | 52.8 | 4.0 |
| 200 cycles | 3.7 | 53.4 | 4.5 |
| % retained | 82.22% | 110.56% | 93.75% |
| CS-17 Taber (cycles) | 350 | | 25 |
| S-42 Taber (cycles) | 25 | 150 | 5 |
| Steel Wool Scratch | | | |
| Extra Fine #000 | 0/0 | 0/1 | 2/0 |
| Medium #1 | 0/0 | 2/1 | 3/0 |
| Coarse #3 | 0/0 | 3/1 | 4/0 |
| Scotch Brite | 0/0 | 3/0 | 4/0 |
| Stain (6 hour) | | | |
| Mustard | 0.5 | 0.5 | 0.5 |
| Iodine | 4 | 4 | 5 |
| Black RIT dye | 4 | 3.5 | 5 |
| Red Food Color | 5 | 1 | 5 |
| Brown Shoe Polish | 0 | 0 | 5 |
| Nail Polish Remover | 0 | 0 | 1 |
| Black "Sharpie" Marker | 5/5/0 | 5/5/1 | 5/5/5 |
| Green "Sharpie" Marker | 5/1/0 | 4/1/0 | 5/3/5 |
| Hot/Cold Checks (10 cycles) | Pass | Pass | Pass |

The data in Table 5 shows that the coating system of the present invention exhibits adhesion comparable to the controls, gloss comparable to the oil system, significantly improved abrasion resistance compared to the oil system, improved scratch resistance compared to the controls, and stain resistance improved over the oil system and comparable to the UV-curable system.

Whereas particular embodiments of this invention have been described above for purposes of illustration, it will be evident to those skilled in the art that numerous variations of the details of the present invention may be made without departing from the invention as defined in the appended claims.

What is claimed:

1. A low gloss, wear-resistant coating system comprising:
   a. a binder; and
   b. a silica composition comprising first silica particles comprising untreated silica, second silica particles comprising organic treated silica, and third silica particles comprising wax treated silica,
   wherein the coating system exhibits a 60° gloss value of 20 gloss units or less when measured with a glossmeter.

2. The coating system of claim 1, wherein said silica composition comprises equal amounts of each of said first particles, said second particles, and said third particles.

3. The coating system of claim 1, wherein said binder comprises a sealer composition.

4. The coating system of claim 3, wherein said sealer composition is provided in a first layer, the coating system further comprising a stain composition underlying said first layer and a topcoat composition overlying said first layer.

5. The coating system of claim 4, where at least one of said stain composition and said topcoat composition contain silica particles.

6. The coating system of claim 4, wherein said silica particles in said stain composition and/or topcoat composition comprise untreated silica, fumed silica, and/or wax treated silica.

7. The coating system of claim 4, wherein the gloss of said sealer composition when applied to a substrate is less than the gloss of a sealer composition without said silica composition.

8. The coating system of claim 4, wherein said binder is UV-curable.

9. Wood flooring to which has been applied the coating system of claim 1.

10. A method of imparting abrasion resistance to a substrate with low gloss, comprising applying to at least a portion of said substrate the coating system of claim 1.

11. The method of claim 10, wherein said substrate comprises wood.

12. A coating system comprising a multilayered composition, the system comprising:
   (a) a first layer comprising a stain composition exhibiting a maximum 60° gloss value of 20 when measured with a glossmeter;
   (b) a second layer comprising a sealant composition exhibiting a maximum 60° gloss value of 15 when measured with a glossmeter; and
   (c) a third layer comprising a topcoat composition exhibiting a maximum 60° gloss value of 7 when measured with a glossmeter.

13. The coating system of claim 12, wherein the sealant composition comprises:
   a. a binder; and
   b. a silica composition comprising first silica particles comprising untreated silica, second silica particles comprising organic treated silica, and third silica particles comprising wax treated silica.

14. The coating system of claim 13, wherein said silica composition comprises equal amounts of each of said first particles, said second particles, and said third particles.

15. The coating system of claim 13, wherein the binder is UV-curable.

16. Wood flooring to which has been applied the coating system of claim 12.

* * * * *